United States Patent [19]
Kato et al.

[11] 4,104,259
[45] Aug. 1, 1978

[54] FIREPROOF POLYESTERS FROM BROMINATED DIHYDROXY ALKOXY-DIPHENYL SULFONES

[75] Inventors: Yasuo Kato, Shiga; Tadashi Ikegami; Junichi Harukawa, both of Otsu; Katsuhiko Kato, Otsu, all of Japan

[73] Assignee: Toyo Boseki Kabushiki Kaisha, Osaka, Japan

[21] Appl. No.: 633,091

[22] Filed: Nov. 18, 1975

Related U.S. Application Data

[63] Continuation-in-part of Ser. No. 503,692, Sep. 6, 1974, abandoned.

[30] Foreign Application Priority Data

Sep. 7, 1973 [JP] Japan .................................. 48-101423
Nov. 21, 1973 [JP] Japan .................................. 48-131427

[51] Int. Cl.² .............................................. C08G 63/68
[52] U.S. Cl. ............................. 528/169; 260/40 P; 260/860; 260/DIG. 24; 528/173
[58] Field of Search ............ 260/49, 61, 860, DIG. 24, 260/40 P

[56] References Cited

U.S. PATENT DOCUMENTS

| | | | |
|---|---|---|---|
| 3,787,526 | 1/1974 | Burns et al. | 260/860 |
| 3,794,617 | 2/1974 | Mains et al. | 260/47 C |

*Primary Examiner*—Lester L. Lee
*Attorney, Agent, or Firm*—Birch, Stewart, Kolasch and Birch

[57] ABSTRACT

A fireproof linear aromatic polyester having a high stability to ultraviolet rays and heat contains a unit of the formula:

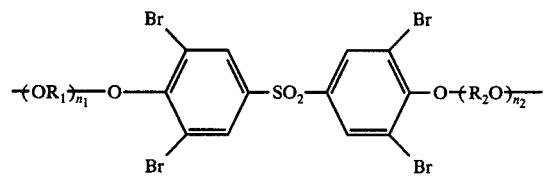

wherein $R_1$ and $R_2$ are each a straight or branched alkylene group having 1 to 5 carbon atoms and $n_1$ and $n_2$ are each an integer of from 1 to 4. The addition of an organic pentavalent phosphorus compound may improve the fireproof properties of products prepared from said polyesters.

11 Claims, No Drawings

FIREPROOF POLYESTERS FROM BROMINATED DIHYDROXY ALKOXY-DIPHENYL SULFONES

This application is a continuation-in-part application of our copending application Ser. No. 503,692 filed on Sept. 6, 1974, now abandoned.

The present invention relates to a fireproof polyester and its production and, more particularly, to a linear aromatic polyester which contains a unit derived from a particular brominated compound in its molecular chain and to its use and production. The linear aromatic polyester is fireproof and stable to ultraviolet rays and heat. In order to further improve the properties of the linear aromatic polyester, an organic pentavalent phosphorus compound may be added to products prepared from said polyester.

Thermoplastic polyesters have been widely used in the production of fibers, films, boards and the like. However, most of them, e.g., polyethylene terephthalate, are inflammable so that thermoplastic polyesters having a fireproof property are in high demand. Various proposals have been made to provide them with a fireproof property. One of them is to incorporate in their molecules a brominated compound such as brominated phthalic acid, brominated terephthalic acid, brominated bisphenol A, brominated p-hydroxybenzoic acid or brominated neopentylglycol as a monomeric component. However, the use of such brominated compounds affords various defects to the resultant polyesters. For example, where said brominated bisphenol A or brominated neopentylglycol is employed, the resultant polyester is insufficient in whiteness due to the low heat resistance of the brominated compound, and the polymerization reaction is inhibited in the presence of such a brominated compound. Furthermore, for example, where a brominated compound wherein a bromine atom is linked directly to a benzene ring is used, the resultant polyester is made markedly yellowish by ultraviolet rays.

As the result of extensive studies, it has now been found that the use of a certain brominated compound as a monomeric component in the production of polyesters can provide the resulting polyesters with an excellent fireproof property and a high stability to ultraviolet rays and heat. It is advantageous to employ said brominated compound for the purpose of this invention because it does not cause a coloring in the course of the production of the polyesters and also in the manufacture of finished products therefrom. It has also been found that the incorporation of a phosphorus compound in the polyesters can enhance the fireproof property and even when blended with cotton fibers, assure a good fireproof property.

The linear aromatic polyester of the present invention contains in its molecular chain a unit of the formula (I):

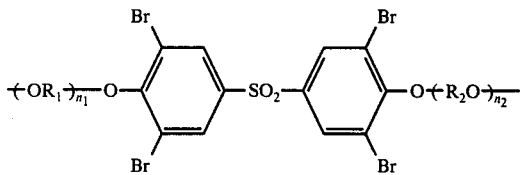

wherein $R_1$ and $R_2$ are each a straight or branched alkylene group having 1 to 5 carbon atoms and $n_1$ and $n_2$ are each an integer of from 1 to 4. The unit that should be contained in the molecular chain of the linear polyester according to the present invention is derived from a brominated compound of the following formula (II):

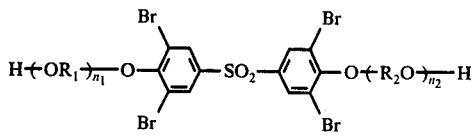

wherein $R_1$, $R_2$, $n_1$ and $n_2$ have the same meaning as above.

The fireproof polyester of this invention may be produced by polycondensing at least one diol component with at least one dicarboxlic acid component by conventional processes, the diol component containing the brominated compound (I) in an amount that the content of the unit derived therefrom in the resulting polyester is from about 3 to 30% by weight in terms of bromine based on the weight of the polyester.

The diol component to be used in the present invention includes, for example, ethylene glycol, propylene glycol, butanediol, diethylene glycol, polyethylene glycol, bis-2-hydroxylethylsulfone, 1,4-cyclohexanedimethanol and the like.

The dicarboxlic acid component to be employed in the present invention includes terephthalic acid, isophthalic acid, naphthalenedicarboxylic acid and so forth. The functional derivatives of these dicarboxylic acids may include, for example, those acids esterified at their carboxyl group by a lower alkyl group having from one to six carbon atoms, such as dimethyl terephthalate or dimethyl isophthalate.

Particularly preferred examples of the diol component and the dicarboxylic acid component are those which can produce polyethylene terephthalate, polyesters containing not less than about 60 mol % of ethylene terephthalate units, polypropylene terephthalate, polytetramethylene terephthalate, poly-1,4-cyclohexylenedimethylene terephthalate, polyethylene sebacate and the like.

Examples of the brominated compound (II) are as follows: bis[4-(2-hydroxyethoxy)-3,5-dibromophenyl]sulfone, bis[4-(2-hydroxypropoxy)-3,5-dibromophenyl]sulfone, bis[4-(3-hydroxypropoxy)-3,5-dibromophenyl]sulfone, bis[4-(4-hydroxybutoxy)-3,5-dibromophenyl]sulfone, bis[4-diethylene-glyoxy-3,5-dibromophenyl]sulfone and the like. The use of the brominated compound having a symmetrical configuration wherein $n_1$ and $n_2$ are each 1 is particularly preferred for obtaining a high molecular weight polyester having a good property.

The brominated compound (II) may be produced, for example, by reaction between bis[4-hydroxy-3,5-dibromophenyl]sulfone and a haloalkanol or an alkylene oxide. For example, bis[4-(2-hydroxyethoxy)-3,5-dibromophenyl]sulfone may be produced in the following manner: 80 parts by weight of sodium hydroxide and 500 parts by weight of water are charged into a reactor equipped with a cooler, a dropping funnel and an agitator. Thereto are added 566 parts by weight of bis[4-hydroxy-3,5-dibromophenyl]sulfone and 250 parts by weight of dioxane, and the resultant mixture is stirred for 4 hours while refluxing. 322 parts by weight of ethylene chlorohydrin is then dropwise added thereto, and the resulting mixture is stirred for 30 hours while heating it under reflux. After cooling, the precipitate is collected by filtration, washed with ethanol and dried at 70° C. under reduced pressure, followed by recrystallization from a mixture of dioxane and methanol to give the objective compound as colorless crystals. Other brominated compounds can be produced in the same manner as above.

The brominated compound (II) may be used in such an amount that the content of the unit of the formula (I) originated therefrom in the resulting polyester is from about 3 to 30 percent by weight in terms of bromine based on the weight of the polyester When it is smaller than the lower limit, the fireproof property of the produced polyester will become insufficient. When it is larger than the upper limit, the fireproof property is not greatly enhanced, and undesirable problems such as a decrease in the polymerization activity may arise. When the bromine content is from about 3 to 15 percent by weight, the properties other than the fireproof property may be particularly improved to an excellent extent.

The introduction of the brominated compound (II) as the monomeric unit into the molecular chain of the polyester may be effected at a suitable stage in its production. For example, the brominated compound (II) may be added to the reaction system at the beginning of ester exchange or after the completion of ester exchange or at the initial stage of polycondensation. It is not desired, however, to add the brominated compound (II) to the reaction system at the later stage of polycondensation, because the resultant polyester otherwise will contain a large amount of unreacted materials or the quality of any finished product therefrom becomes deteriorated. Additives such as pigments, ultraviolet ray absorbers, heat stabilizers, antistatic agents, plasticizers and releasing agents may be employed for preparing the polyester or the finished products produced therefrom.

The linear aromatic polyester of the present invention possesses a fireproof property sufficient for practical use. When a relatively large amount of the brominated compound (II), however, is incorporated even within the said quantitative limitation, a considerable decrease in the melting point of the resulting polyester may sometimes arise depending on the kinds of the monomeric components used. The lowering of the melting point of the polyester may impair the physical properties of the products prepared therefrom. In order to improve those disadvantages which may occur in the products according to the present invention, an organic pentavalent phosphorus compound can be incorporated thereinto.

As the organic pentavalent phosphorus compound (hereinafter referred to also as "organic phosphorus compound"), there may be used various organic phosphorus compounds, including organic phosphorus compounds having a low molecular weight such as, for example, phosphoric esters, phosphonic esters and phosphinic esters, and organic phosphorus compounds having a higher molecular weight.

Examples of the phosphoric esters are triphenyl phosphate, tricresyl phosphate, tridecyl phosphate, trinonylphenyl phosphate, phenyldidecyl phosphate, diphenyldecyl phosphate and so on. The phosphorus compounds are also included therein, which has the following formula:

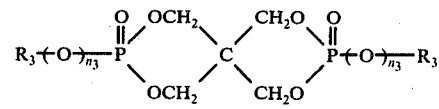

wherein $R_3$ is a monovalent organic group, particularly a hydrocarbon residue having from 1 to 18 carbon atoms, such as, for example, methyl, ethyl, propyl, butyl, pentyl, cyclohexyl, phenyl, p-cresyl, o-cresyl, naphthyl or the like, and $n_3$ is an integer of 0 or 1. The phosphonic esters include, for example, diphenylbenzene phosphonate, diphynylmethane phosphonate, diphenylethane phosphonate and so on. Examples of the phosphinic esters are phenyldibenzene phosphinate and the like.

Preferred organic phosphorus compounds of high molecular weight are those having a recurring unit having the following formula:

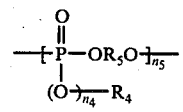

wherein $R_4$ is a monovalent organic group, particularly a hydrocarbon residue having 1 to 18 carbon atoms, such as, for example, methyl, ethyl, propyl, butyl, pentyl, cyclohexyl, phenyl, cresyl, xylyl, naphthyl and so on, $R_5$ is a divalent organic group, particularly a hydrocarbon residue having from 1 to 20 carbon atoms, such as, for example, 1,4-butylene, 1,4-phenylene, 1,3-phenylene, 4,4-biphenylene and the like, $n_4$ is an integer of 0 or 1 and $n_5$ is an integer of 5 to 100. The recurring units of said formula may be derived from a compound of the formula:

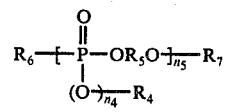

wherein $R_6$ is halogen, hydroxyl, $OR_8$, $OR_5$—OH or $OR_5$—$OR_8$, $R_7$ is hydrogen, $R_8$ is a monovalent hydrocarbon residue having 1 to 18 carbon atoms or

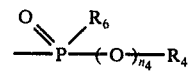

(wherein $R_4$, $R_6$ and $n_4$ have the same meanings as above). The symbol $R_5$ can be also the one of the formula:

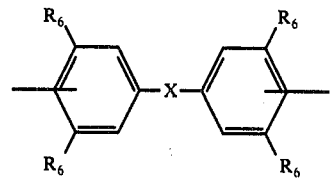

wherein all the $R_6$ groups may be the same or different and are each hydrogen or methyl and X is a divalent organic group, particularly a hydrocarbon residue having from 1 to 6 carbon atoms, —CO—, —SO$_2$—, —SO—, —O—, —CONH— or —SO$_2$NH—, where said hydrocarbon residue includes, for example, methylene, ethylene, propylene, methylethylene, methylpropylene, dimethylmethylene, dimethylethylene, ethylethylene or the like. Both the symbols $R_4$ and $R_5$ may be substituted by chlorine or bromine. However, in this case, the finished products may sometimes be insufficient in heat resistance or undesirably colored by ultraviolet rays. Where the number of the symbol $n_5$ exceeds 100, the compatibility of the organic phosphorus compound with the polyester or the processability of the resulting mixture is lowered. In many cases, it is desired for $n_4$ to be 0, depending on the kinds of the symbols $R_4$ and $R_5$.

The amount of the organic phosphorus compound which may be incorporated into the polyester may vary with the bromine content of the polyester and a desired extent of non-inflammability, and it may be usually not more than about 1.0% by weight, preferably not more than 0.7% by weight, in terms of phosphorus based on the weight of the polyester. When it is more than about 1.0% by weight, the physical properties of the finished product are impaired without a considerable increase in non-inflammability.

The incorporation of the organic phosphorus compound into the polyester may be carrried out at the stage of polycondensation. It is, however, preferred to make the incorporation during the stage after the completion of the polycondensation, but before the further processing of the resulting polyester. The incorporation is usually effected by admixing the polyester in a melt state with the organic phosphorus compound or by admixing the pellets of the polyester with the organic phosphorus compound.

The fireproof polyester of the present invention may be advantageously admixed with any additional polyester and then subjected to molding, shaping or the like. The admixing may be effected in any optional manner so long as uniform mixing is attained. For example, the polyesters which are separately molded into powders, flakes or chips are blended with each other. The polyesters in a melt state may be admixed together under stirring. Furthermore, the fireproof polyester may be admixed with any additional polyester on melt molding without difficulty so as to give side-by-side type fibers or sheath core type fibers.

One of the advantages of the present invention is that the temperature during the ester exchange and/or the polycondensation need not be kept low because the brominated compound (II) shows an excellent heat resistance without impairing its excellent whiteness. Accordingly, the polyester of the present invention can be prepared by simple operations easily and economically, and the finished product prepared using the fireproof polyester of the present invention can maintain an excellent resistance to light such as ultraviolet rays without a decrease in the inherent property of polyesters.

Another advantage of this invention is that polyesters with a small bromine content can exhibit an excellent fireproof property, compared with those prepared by conventional processes. Therefore, the polyester, when admixed with an ordinary polyester in a suitable proportion and then molded, can provide the resulting molded product with a good fireproof property together with a high resistance to ultraviolet rays, as with the products prepared directly from polycondensation.

It is particularly noted that the polyester incorporated with the organic phosphorus compound shows an excellent fireproof property even when admixed with cotton fibers. It is relatively easy to impart flame retardance to molded products using thermoplastic polyesters alone because they easily melt with the approach of a fire source. When cotton fibers, however, are incorporated therein, the resulting mixture product may tend to burn easily, even if the cotton fibers themselves was previously treated for imparting a fireproof property thereto. This tendency is commonly seen in such a mixture as containing cotton fibers. Such a mixture that has been most commonly employed is the one having the weight ratio of thermoplastic polyesters to cotton fibers of about 65 : 35, but this has the same tendency to easily burn. This problem of the conventional products has not yet been solved. The problem can now be solved by the use of the fireproof linear aromatic polyester of the present invention.

It is also noted that the finished product obtained using the polyester of the invention shows an excellent whiteness when bleached. For example, fibers made of conventional fireproof polyesters containing aromatic brominated compounds, when bleached, are usually lowered in whiteness. This would probably result due to the liberation of the bromine atoms. On the comtrary, fibers made of the fireproof polyester of the invention exhibit an improved whiteness after being bleached. Thus the bromine atoms in the polyester of the invention would hardly be liberated on bleaching.

In the following Examples, various physical properties are determined as follows:

(1) Melting point of the polyester:-

The specimen is charged in a differential thermal analyzer-thermobalance of desk type (manufactured by Rigaku Denki K. K.), and the temperature is elevated at a rate of 5° C. per minute in an argon stream. The temperature at which the specimen begins to melt is observed as the melting point.

(2) Melting point of the unstretched yarn:-

Determination is made in the same manner as above but the temperature is elevated at a rate of 20° C. per minute in air.

(3) Intrinsic viscosity of the polyester and the unstretched yarn:-

Determination is made in a mixture of phenol and 1,1,2,2-tetrachloroethane (6 : 4, by weight) at 30° C.

(4) Light resistance of the polyester:-

The specimen is irradiated with ultraviolet radiation for 40 hours by the aid of a fade meter, and the coloring is observed.

(5) Light resistance of the unstretched yarn:-

The unstretched yarn as a specimen is closely rolled on a thick paper without any gap and the half is covered by a foil of aluminum. Irradiation is made by the aid of a fade-O-meter for hours. Then, the foil is removed, and observation is made on the color difference between the part receiving the irradiation and the part not receiving the irradiation. The light resistance is determined by the difference between them.

(6) Fireproof property of the polyester:-

Determination is made by one of the following procedures:

(6-1) LOI method

Measurement is made according to JIS (Japanese Industrial Standard) K 7201-1972, Method A (No. 2). A piece of cloth being 150 mm. × 20 mm. in size is intimately rolled on a wire having a diameter of 0.8 mm. into a string having a length of 80 to 100 mm. The wire is then removed by pulling it out therefrom. This test sample is used for test using a device as shown in FIG. 1 of the accompanying drawings. The test piece 2 is set up by a supporter 3 in a combustion cylinder 1 in which a wire net 4 is provided and a glass particle layer 5 is present below the wire net. Into the combustion cylinder 1, a gaseous mixture of oxygen and nitrogen whose oxygen content is optionally regulated is introduced from the lower portion of the cylinder through a tube 6 as shown by the arrows. At the upper portion of the combustion cylinder, an igniter 7 is provided. The test piece is set up by the supporter 2 in the combustion cylinder 1 in such a manner that the distance between the top of the test piece and the upper end of the combustion cylinder is 100 mm. or more. After the gaseous mixture is introduced into the combustion cylinder for 30 seconds at a rate of 11.4 liters per minute, the test piece is ignited on its top with the igniter 8. The minimum oxygen content in the gaseous mixture required for continuing the combustion of the test piece 2 for not less than 3 minutes or for continuously burning the test piece up to not less than 50 mm. after flaming is measured.

(6-2) Improved basket method

Determination is made using a device as shown in FIG. 2 of the accompanying drawings. 1 gram of the specimen, poweder to about 20 mesh, is charged into a conical vessel 11 made of stainless steel wire net No. 36 (50 mesh). The bottom of the vessel is contacted for 20 seconds with a butane gas flame 13 containing air which is introduced from a opening of 2 mm. in diameter by the use of a microburner 12 having an opening of 6 mm. in diameter. The shape of the vessel, the bulk of the flame and the distance between the bottom of the vessel and the flame are as shown in FIG. 2. The temperature of the upper portion of the flame which is contacted with the vessel is about 750° C. A part of the test sample is melted and drops into an aluminum foil 14. The residue left unburned in the wire net vessel and in the aluminum foil is weighed, and the percentage of the weights with respect to the initial weight of the specimen before contact with the flame as well a the flame-remaining time after removal of the fire are used for evaluation of the fireproof property.

(7) Fireproof property of the unstretched yarn:-

A cotton yarn having a phosphorus content of 1.8% by weight and processed for flame resistance by the use of "Pirovatex CP (manufactured by Ciba-Geigy, Ltd.)" and a polyester yarn are intertwined in the weight ratio thereof to the cotton yarn of 65 : 35 to make a string of 15 cm. in length, of which the linear density is 0.009 g/cm. A flame of a match is brought close to the string from the lower portion. After removal of the flame, observation is made on the self-extinguishability from which the fireproof property is judged.

(8) Whiteness of the knitted product made of the stretched yarns:-

The spectrophotometric reflection characteristic curve is measured on the knitted product made of stretched yarns according to the method as described in JIS L1083, and calculation is made according to the Judd's method.

The brominated compounds (II) used in the Examples are shown in Table A.

Table A

| No. | Structure | Temperature for initiation of decomposition (° C)* |
|---|---|---|
| 1 | HO—C₆H₂(Br)₂—C(CH₃)₂—C₆H₂(Br)₂—OH | 224 |
| 2 | HO—C₆H₂(Br)₂—SO₂—C₆H₂(Br)₂—OH | 259 |
| 3 | HOCH₂CH₂O—C₆H₂(Br)₂—C(CH₃)₂—C₆H₂(Br)₂—OCH₂CH₂OH | 261 |
| 4 | HOCH₂CH₂O—C₆H₂(Br)₂—SO₂—C₆H₂(Br)₂—OCH₂CH₂OH | 278 |
| 5 | HOCHCH₃CH₂O—C₆H₂(Br)₂—SO₂—C₆H₂(Br)₂—OCH₂CHCH₃OH | 270 |

Note:
*The specimen is charged into a differential thermal analyzer - thermobalance of desk type (manutured by Rigaku Denki K.K.), and the temperature is elevated at a rate of 5° C/min in argon stream. The temperature at which the specimen begins to decompose is measured.

EXAMPLE 1

In a reactor, dimethyl terephthalate (377 g), ethylene glycol (250 g), zinc acetate dihydrate (0.135 g) and antimony trioxide (0.135 g) are charged, and the ester exchange is effected in a per se conventional manner. After the reaction is completed, the reaction mixture is transferred into an autoclave, and a designed amount of the bromine compound (I) as shown in Table A is added thereto. The resultant mixture is stirred at 275°0 C for 10 minutes in nitrogen stream, and the pressure is gradually reduced to 0.1 mmHg or lower in 2 hours. The properties of the obtained polyester are shown in Table 1, from which it is understood that the polyesters of the invention are superior in various properties to the conventional polyesters.

Table 1

| Polyester No. | Bromine compound No. | Bromine compound Amount (mol %) | Bromine content (%) | Intrinsic viscosity | Melting Point (° C) | Color |
| --- | --- | --- | --- | --- | --- | --- |
| A | — | 0 | 0 | 0.61 | 260 | Colorless |
| B | | 3 | 4.6 | 0.59 | 252 | Colorless |
| C | 4 | 5 | 7.9 | 0.59 | 247 | Colorless |
| D | | 30 | 27.8 | 0.51 | 217 | Pale yellow |
| E | | 3 | 4.5 | 0.57 | 250 | Colorless |
| F | 5 | 5 | 7.9 | 0.58 | 247 | Colorless |
| G | | 3 | 4.6 | 0.57 | 252 | Colorless |
| H | 3 | 5 | 7.9 | 0.57 | 247 | Pale yellow |

EXAMPLE 2

The polyester obtained in Example 1 is dried at 110° C under a pressure of 0.1 mmHg or lower for 16 hours and subjected to preparation of stretched yarn by the aid of a spinning machine and a stretching machine. The properties of the obtained yarn are shown in Table 2.

Table 2

| Yarn No. | Polyester No. | Intrinsic viscosity | Denier/ Number of filaments | Breaking strength (g/d) | Breaking elongation (%) |
| --- | --- | --- | --- | --- | --- |
| a | A | 0.60 | 73/20 | 4.7 | 45 |
| b | B | 0.58 | 77/20 | 4.2 | 43 |
| c | C | 0.575 | 78/20 | 4.1 | 43 |
| d | E | 0.56 | 76/20 | 4.0 | 42 |
| e | F | 0.57 | 76/20 | 4.0 | 40 |
| f | G | 0.56 | 76/20 | 4.1 | 42 |
| g | H | 0.555 | 77/20 | 3.9 | 40 |

EXAMPLE 3

The stretched yarn obtained in Example 2 is knitted, and the fireproof property and the light resistance of the knitted product are determined. The results are shown in Table 3, from which it is understood tht the stretched yarns made from the polyesters of the invention are almost equal in the fireproof property but superior in the light resistance to the stretched yarns made from the conventional polyesters.

Table 3

| Yarn No. | Fireproof Property (by LOI method) (%) | Light resistance Before irradiation | Light resistance After irradiation |
| --- | --- | --- | --- |
| a | 19 – 20 | Colorless | Colorless |
| b | 27.3 | Colorless | Colorless |
| c | 29.5 | Colorless | Colorless |
| d | 27.0 | Colorless | Colorless |
| e | 29.5 | Pale yellow | Pale yellow* |
| f | 26.5 | Colorless | Pale yellow |
| g | 29.3 | Pale yellow | Yellow |

Note:
*Any change in the color is not observed before and after the irradiation.

EXAMPLE 4

The polyester A (33.4 g) and the polyester D (6.6 g) are charged into a test tube and kneaded at 275° C. for 15 minutes in a nitrogen stream after being dried at 110° C. under a pressure of 0.1 mm.Hg. or lower for 16 hours. The kneaded product is crushed into powders for 20 mesh or less to obtain a test sample, which is subjected to determination of the fireproof property by the improved basket method. For comparison, the polyester B or G is crushed into powders of 20 mesh or less and subjected to measurement of the fireproof property as above. The results are shown in Table 4, from which it is understood that the polyester blend comprising the polyester of the invention and a conventional polyester is almost equal in the fireproof property to the polyester alone.

Table 4

| Test sample | Bromine content (%) | Fireproof property Flame-remaining time (sec.) | Fireproof property Unburnt residue (%) |
| --- | --- | --- | --- |
| Blended product | 4.7 | 3.5 | 93.0 |
| B | 4.6 | 4.0 | 91.0 |
| G | 4.6 | 5.5 | 90.5 |

EXAMPLE 5

Part I:-

(1) In a conventional manner, bis(2-hydroxyethyl) terephthalate and the bromine compound No. 4 are subjected to polycondensation at about 270° C under a pressure of about 0.3 mmHg in the presence of antimony trimethylate as a catalyst. The produced polyester is melt spun by the aid of a spinning machine to give an unstretched yarn. (2) In a conventional manner, dimethyl terephthalate and ethylene glycol are subjected to ester exchange at about 210° C. under atmospheric pressure in the presence of zinc acetate as a catalyst. In the course of the reaction, titanium oxide dispersed in ethylene glycol is added to the reaction system is an amount of 0.5 % by weight to the polymer as finally obtained. The produced oligomer is transferred to an autoclave, the bromine compound No. 4 and antimony trimethylate as a catalyst are added thereto, and polycondensation is carried out at about 270° C under a pressure of about 0.3 mmHg in a conventional manner. The obtained polyester is melt spun by the aid of a spinning machine to give an unstretched yarn.

(3) In the same manner as in (2), there is prepared a polyester. The polyester is blended with poly(phenyl-4,4'-sulfonebisphenylphosphonate) having a molecular weight of 12,000 in an amount of 2% by weight, and the resultant mixture is kneaded in a melt state under atmospheric pressure for 15 minutes. The obtained polymer is melt spun by the aid of a spinning machine to give an unstretched yarn.

(4) In the same manner as in (3) but using poly(-phenylbenzenephosphonate) having a molecular weight of about 10,000 in place of poly(phenyl-4,4'-sulfonebis-phenyl-phosphonate), a polyester and an unstretched yarn are produced.

(5) In the same manner as in (3) but using triphenyl phenylphosphate in place of poly(phenyl-4,4'-sulfonebisphenylphosphonate), a polyester and an unstretched yarn are produced.

(6) In the same manner as in (2) but using the bromine compound No. 3 in place of the bromine compound No. 4, a polyester and an unstretched yarn are produced.

(7) In the same manner as in (3) but using the bromine compound No. 3 in place of the bromine compound No. 4, a polyester and an unstretched yarn are produced. (8) In a conventional manner, dimethyl terephthalate and ethylene glycol are subjected to ester exchange at about 210° C under atmospheric pressure in the presence of zinc acetate as a catalyst. The reaction product is transferred to an autoclave, antimony trimethylate is added thereto, and polycondensation is carried out at about 270° C under a pressure of about 0.3 mmHg in a conventional procedure. The produced polyester is blended with poly(p-phenylenebenzenephosphonate) having a molecular weight of 10,000 in an amount of 16% by weight. Using the blended product, there is prepared an unstretched yarn in the same manner as described in 3).

Part II:-

On the unstretched yarns prepared in Part I, the intrinsic viscosity and the melting point are measured. The results are shown in Table 5, from which it is understood that the use of a larger amount of the bromine compound (I) as a monomeric component for production of the polyester results in a larger depression of the melting point.

Part III:-

The unstretched yarns prepared in Part I are subjected to measurement of the fireproof property. The results are shown in Table 6, wherein the marks indicate the following significances: O ---- self-extinguishable, Δ ---- flame remaining even after removal of the fire source but extinguishing before the paper string of 15 cm in length is burnt off; x ---- paper string completely burnt off. From Table 6, it is understandable that the specimens VII to X have an excellent fireproof property in comparison with other specimens. The good fireproof property of the specimens IV and V is attributable to the larger content of the bromine compound (I) but the practical utility is decreased due to the lower melting point. The specimen XII is good in fireproof property but, as described below, inferior in light resistance.

Part IV:-

The unstretched yarns prepared in Part I are subjected to determination of light resistance. The results are shown in Table 7, from which it is understood that no difference of color is observed on the specimens VI and VII between the irradiated part and the non-irradiated part, and those specimens are superior to the specimens XI and XII in light resistance.

Table 6

| Unstretched yarn No. | Fireproof property |
| --- | --- |
| I | x |
| II | x |
| III | x |
| IV | Δ |
| V | O |
| VI | x |
| VII | O |
| VIII | O |
| IX | Δ |
| X | O |
| XI | x |
| XII | Δ |
| XIII | x |

Table 7

| Unstretched yarn No. | Light resistance | |
| --- | --- | --- |
| | Before irradiation | After irradiation |
| VI | Colorless | Colorless |
| VII | Colorless | Colorless |
| XI | Colorless | Pale yellow |
| XII | Colorless | Yellow |

EXAMPLE 6

The stretched yarns obtained in Example 2 are tubularly knitted and washed in an aqueous solution of a nonionic surface active agent (2 g/L) at 70° C for 20 minutes. The washed product is bleached by immersing in an aqueous solution containing sodium hypochloride (2 g/L) and 10% acetic acid (20 g/L) at 100° C for 60 minutes. Then, the resulting product is treated with an aqueous solution containing sodium hydrogen sulfite (2 g/L) at 70° C for 30 minutes, followed by washing with water. The whiteness of the thus bleached knitted product is measured and compared with that of the knitted product before bleaching. The results are shown in Table 8.

Table 8

| Polyester No. | Whiteness (%) | |
| --- | --- | --- |
| | Before bleaching | After bleaching |
| B | 72 | 78 |
| G | 70 | 62 |

What we claim is:

1. A fireproof composition comprising a linear aromatic polyester having in its molecular chain a unit of the formula:

Table 5

| Preparation procedure* | Unstretched yarn No. | Bromine compound | | Phosphorus compound | | Unstretched yarn | |
| --- | --- | --- | --- | --- | --- | --- | --- |
| | | Amount (mol %) | Bromine content (%) | Amount (mol %) | Phosphorus content (%) | Intrinsic viscosity | Melting point (° C) |
| 1 | I | 0 | 0 | 0 | 0 | 0.56 | 265 |
| | II | 2 | 3.5 | 0 | 0 | 0.54 | 261 |
| | III | 4 | 6.1 | 0 | 0 | 0.53 | 255 |
| | IV | 6 | 8.6 | 0 | 0 | 0.55 | 240 |
| | V | 12.5 | 15 | 0 | 0 | 0.48 | 170 |
| 2 | VI | 5 | 7.2 | 0 | 0 | 0.56 | 250 |
| 3 | VII | 5 | 7.3 | 2 | 0.16 | 0.55 | 249 |
| 4 | VIII | 5 | 7.4 | 2 | 0.25 | 0.57 | |
| | IX | 5 | 7.2 | 3 | 0.30 | 0.53 | |
| 5 | X | 5 | 7.3 | 7 | 0.67 | 0.51 | |
| 6 | XI | 5 | 7.4 | 0 | 0 | 0.55 | |
| 7 | XII | 5 | 7.3 | 2 | 0.17 | 0.56 | |
| 8 | XIII | 0 | 0 | 16 | 2.2 | 0.57 | |

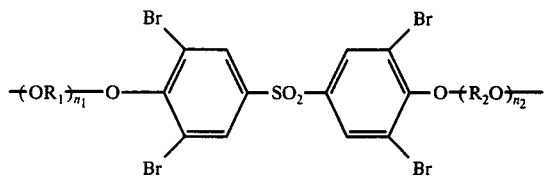

wherein $R_1$ and $R_2$ are each a straight or branched alkylene group having 1 to 5 carbom atoms and $n_1$ and $n_2$ are each of an integer of 1 to 4, said unit being contained in an amount of from about 3 to 30 percent by weight in terms of bromine based on the weight of said polyester, said polyester being prepared by a process comprising polycondensing at least one diol component with at least one dicarboxylic acid component, the diol component containing a brominated compound containing said unit, further including an organic compound of pentavalent phosphorous selected from at least one member of the group consisting of a phosphoric ester, a phosphonic ester, a phosphinic ester and a high molecular weight phosphorus compound having a degree of polymerization of 5 to 100 and wherein said organic phosphorus compound is incorporated into the polyester in an amount of not more than about 1.0 percent by weight based on the weight of the polyester.

2. The fireproof composition according to claim 1, wherein the phosphoric ester is from at least one member of the group consisting of triphenyl phosphate, tricresyl phosphate, tridecyl phosphate, trinonylphenyl phosphate, phenyldidecyl phosphate, diphenyldecyl phosphate and phosphorus compounds of the formula:

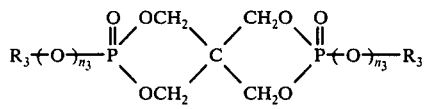

wherein $R_3$ is a monovalent hydrocarbon group of 1 to 18 carbon atoms and $n_3$ is 0 to 1.

3. The fireproof composition according to claim 2, wherein said organic phosphorus compound has as $R_3$ a radical selected from at least one member of the group consisting of methyl, ethyl, propyl, butyl, cyclohexyl, phenyl, p-cresyl, o-cresyl and naphthyl.

4. The fireproof composition according to claim 1, wherein the phosphonic ester is selected from at least one member of the group consisting of diphenylbenzene phosphonate, diphenylmethane phosphonate and diphenylethane phsophonate.

5. The fireproof composition according to claim 1, wherein the phosphinic ester is phenyldibenzene phosphinate.

6. The fireproof composition according to claim 1, wherein the high molecular weight phosphorus compound has a recurring unit of the formula:

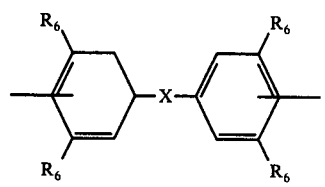

wherein $R_4$ is a monovalent hydrocarbon group of 1 to 18 carbon atoms, $R_5$ is a divalent hydrocarbon group of 1 to 20 carbon atoms, $n_4$ is 0 to 1 and $n_5$ is from 5 to 100.

7. The fireproof composition according to claim 6, wherein $R_4$ is selected from at least one member of the group consisting of methyl, ethyl, propyl, butyl, pentyl, cyclohexyl, phenyl, cresyl, xylyl and naphthyl.

8. The fireproof composition according to claim 6, wherein the $R_4$ group is substituted by chlorine or bromine.

9. The fireproof composition according to claim 6, wherein $R_5$ is selected from at least one member of the group consisting of 1,4-butylene, 1,4-phenylene, 1,3-phenylene, 4,4'-biphenylene or a group of the formula:

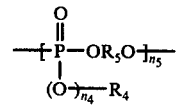

wherein $R_6$ is the same or different and is hydrogen or methyl and X is selected from at least one member of the group consisting of divalent hydrocarbon group of 1 to 6 carbon atoms, —CO—, —$SO_2$—, —O—, —CONH— or —$SO_2$NH—.

10. The fireproof composition according to claim 9, wherein the $R_5$ group is substituted by chlorine or bromine.

11. The fireproof composition according to claim 1, wherein the amount of the organic phosphorus compound is not more than 0.7 percent by weight based on the weight of the polyester.

* * * * *